United States Patent
Foti

(10) Patent No.: US 10,645,554 B2
(45) Date of Patent: May 5, 2020

(54) INTRA-M2M SP MOBILITY SUPPORT IN ONEM2M ENVIRONMENT

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 108 days.

(21) Appl. No.: 15/561,132

(22) PCT Filed: Mar. 30, 2015

(86) PCT No.: PCT/IB2015/052348
§ 371 (c)(1),
(2) Date: Sep. 25, 2017

(87) PCT Pub. No.: WO2016/156919
PCT Pub. Date: Oct. 6, 2016

(65) Prior Publication Data
US 2018/0054694 A1    Feb. 22, 2018

(51) Int. Cl.
| | | |
|---|---|---|
| H04W 4/00 | (2018.01) | |
| H04W 8/10 | (2009.01) | |
| H04W 4/70 | (2018.01) | |
| H04L 29/08 | (2006.01) | |
| H04W 60/00 | (2009.01) | |
| H04W 60/06 | (2009.01) | |
| H04W 4/20 | (2018.01) | |

(52) U.S. Cl.
CPC .............. *H04W 4/70* (2018.02); *H04W 8/10* (2013.01); *H04L 67/16* (2013.01); *H04W 4/203* (2013.01); *H04W 60/00* (2013.01); *H04W 60/06* (2013.01)

(58) Field of Classification Search
CPC .......... H04W 4/005; H04W 8/10; H04L 67/16
See application file for complete search history.

(56) References Cited

U.S. PATENT DOCUMENTS

2016/0007137 A1* 1/2016 Ahn ................... H04W 4/70
                                                            370/254
2016/0234691 A1* 8/2016 Jeong ................. H04W 4/70

FOREIGN PATENT DOCUMENTS

WO      9943175 A1    8/1999
WO   2014169804 A1    4/2014

OTHER PUBLICATIONS

ONEM2M, "Functional Architecture", OneM2M Technical Specification: Functional Architecture, TS-0001-v1.6.1, Jan. 30, 2015, 1-321.

* cited by examiner

Primary Examiner — Gbemileke J Onamuti
(74) Attorney, Agent, or Firm — Patent Portfolio Builders, PLLC

(57) ABSTRACT

According to an aspect, a method in an initial CSE for maintaining resources for an M2M application includes storing M2M application resources for an ADN registered to the initial CSE and configured for the M2M application. The method also includes detecting that the ADN has roamed out of the initial CSE and into a roamed-in CSE and maintaining the M2M application resources for the M2M application subsequent to said detecting. Resource requests are forwarded to the initial CSE.

19 Claims, 18 Drawing Sheets

INTRA-M2M SP MOBILITY SUPPORT IN ONEM2M ENVIRONMENT

TECHNICAL FIELD

The present disclosure generally relates generally to telecommunications networks that include machine-to-machine (M2M) devices, and more particularly relates to maintaining resources at an initial Common Service Entity (CSE).

BACKGROUND

In an environment in which M2M devices are connected to an M2M service provider (SP) through an access network provided by another entity, the M2M service provider effectively creates a service layer on top of the access network. This service layer is used to deliver services to the M2M devices. Frameworks for providing M2M services have been developed by the European Telecommunications Standards Institute (ETSI) as well as by an organization known as oneM2M.

FIG. 1 illustrates the typical architecture of an M2M system as depicted in the ETSI specifications. According to the oneM2M architecture, an M2M system can be divided into a field domain, in which device gateways and M2M devices reside, and the infrastructure domain, where network-based functions reside. In each domain are application entities (AEs), shown as a Field Domain AE and an Infrastructure Domain AE in FIG. 1, as well as Common Services Entities (CSEs), shown as a Field Domain CSE and an Infrastructure Domain CSE. The AE provides application logic for specific end-to-end M2M solutions, such as for fleet tracking, remote power metering, etc. The CSE includes service functions that are common to the M2M environments and that are specified by oneM2M. These service functions are exposed to other entities through reference points Mca and Mcc. A network services entity (NSE) is also present in each domain, and is represented by a Field Domain NSE and an Infrastructure Domain NSE in FIG. 1. The NSE provides services such as device management, location services, and device triggering.

As part of its definition of the M2M architecture, oneM2M has defined several different types of nodes that it foresees as being part of the typical M2M network deployment. FIG. 2 illustrates some of these nodes. These nodes are functional/logical objects, and are not necessarily mapped to discrete physical devices, although any of them might be in any particular instance. One of these nodes is referred to as an Infrastructure Node (IN)—the IN resides in the Infrastructure Domain, contains one CSE, and may contain any number (including zero) of AEs. Typically, there would be just one IN in a deployment.

Another node is referred to as a Middle Node (MN)—a MN resides in the Field Domain, contains one CSE, and also may or may not contain one or more AEs. The functional/logical object known as the MN may reside in an M2M Gateway, for example. A MN can communicate with an IN and/or another MN and/or an Application Dedicated Node (ADN), which is a node that contains at least one AE but does not include a CSE.

Before a node can take advantage of services provided by the CSE of another node, it needs to register with that CSE. In the current oneM2M architecture, which is a distributed architecture, when an application registers with a CSE, it can create resources for storage in that CSE. These resources can be announced in other CSEs with a pointer back to the original resource. Resources stored in the CSE where the application registers can be read by other applications as long as it is allowed by the proper access control. Pointers to these resources are either discovered, or acquired by off-line means.

SUMMARY

One of the drawbacks of storing resources in CSEs is that a roaming mobile application will register with a new CSE, which is different than the old CSE with which it initially registered and stored resources. This means that all resources in the old CSE will be removed once the application registration expires and hence all pointers (e.g., Uniform Resource Locators or URLs) for different resources stored there are no longer valid. This implies that all other applications that acquired these pointers can no longer use them since they will be invalid. Furthermore, the application will now have to either re-create all the resources that it has stored in the old CSE or start anew.

Neither of these alternatives is appealing since they will lead to an inefficient M2M environment for roaming applications and will also burden the applications with roaming issues. Applications are designed to be generic and run in any environment fixed, or mobile and just focus on the application logic.

Embodiments of the present invention allow an application dedicated node (ADN) configured for an M2M application to roam seamlessly by maintaining resources, such as the validity of URLs created and acquired by M2M applications, at an initial CSE, even if the ADN roamed out of the initial CSE and registered with another CSE. The new and the old CSE may cooperate to maintain proper context for the ADN. The initial CSE will be the contact point for the ADN and is the CSE to which the ADN registers for the first time (at power up, or after deregistered and re-registered again). While roaming, the ADN will continue to use the initial CSE for resource storage. The M2M application, for which the ADN is configured, will submit its request to the newly roamed-in CSE, but store or receive resources stored at the initial CSE. A roamed-out CSE is a CSE that an ADN roams out of. If the ADN roams out of the roamed-in CSE and to another CSE, the resources will be maintained at the initial CSE and resource requests will be forwarded to the initial CSE from the newly roamed-in CSE.

According to some embodiments, a method, in an initial CSE for maintaining resources for an M2M application, includes storing M2M application resources for an ADN registered to the initial CSE and configured for the M2M application. The method also includes detecting that the ADN has roamed out of the initial CSE and into a roamed-in CSE and maintaining the M2M application resources for the M2M application subsequent to said detecting.

According to some embodiments, a method, in a roamed-in CSE into which an ADN configured for a M2M application has roamed from an initial CSE, includes receiving a registration request from the ADN. The method also includes determining that the ADN is roaming in, from the initial CSE and, subsequent to said determining, forwarding, to the initial CSE, resource requests from the ADN addressed to the roamed-in CSE. The initial CSE will continue to service any request on the ADN 308 resources stored in CSE-1 and that come from anywhere else (other ADN, CSE, etc.).

According to some embodiments, a method, in an ADN configured for an M2M application and registered to an initial CSE, includes roaming out of the initial CSE and into a roamed-in CSE and registering with the roamed-in CSE without deregistering from the initial CSE, and before its registration times out.

According to some embodiments, a method for maintaining resources for an M2M application in an M2M system comprising an ADN configured for the M2M application and registered to an initial CSE, includes storing M2M application resources for the ADN in the initial CSE, and the ADN roaming out of the initial CSE and into a roamed-in CSE. The method includes registering the ADN with the roamed-in CSE without deregistering the ADN from the initial CSE, and before its registration times out, and maintaining the M2M application resources for the M2M application at the initial CSE subsequent to the initial CSE detecting that the ADN has roamed out of the initial CSE and into the roamed-in CSE. The method also includes forwarding, to the initial CSE, resource requests from the ADN addressed to the roamed-in CSE.

According to some embodiments, an initial CSE configured to maintain resources for an M2M application and including a processing circuit. The processing circuit is configured to store M2M application resources for an ADN registered to the initial CSE and configured for the M2M application. The processing circuit is also configured to detect that the ADN has roamed out of the initial CSE and into a roamed-in CSE. The processing circuit is configured to maintain the M2M application resources for the M2M application subsequent to said detection.

According to some embodiments, a roamed-in CSE into which an ADN configured for an M2M application has roamed from an initial CSE and including a processing circuit. The processing circuit is configured to receive a registration request from the ADN and determine that the ADN is roaming in, from the initial CSE. The processing circuit is also configured to, subsequent to said determination, forward, to the initial CSE, resource requests from the ADN addressed to the roamed-in CSE.

According to some embodiments, an ADN configured for an M2M application and registered to an initial CSE comprises a processing circuit configured to cause the ADN to roam out of the initial CSE and into a roamed-in CSE and register with the roamed-in CSE without deregistering from the initial CSE and before its registration times out.

According to some embodiments, an M2M system configured to maintain resources for an M2M application includes an initial CSE configured to store M2M application resources for an ADN configured for the M2M application and registered to the initial CSE. The M2M system also includes the ADN configured to roam out of the initial CSE and into a roamed-in CSE and register the ADN with the roamed-in CSE without deregistering the ADN from the initial CSE, and before its registration times out. The initial CSE is configured to maintain the M2M application resources for the M2M application at the initial CSE. The M2M system also includes a roamed-in CSE configured to forward, to the initial CSE, resource requests from the ADN addressed to the roamed-in CSE.

According to some embodiments, a non-transitory computer readable storage medium stores a computer program for maintaining resources for an M2M application, the computer program includes program instructions that, when executed on a processing circuit of an initial CSE, cause the processing circuit to store M2M application resources for an ADN registered to the initial CSE and configured for the M2M application. The instructions also cause the processing circuit to detect that the ADN has roamed out of the initial CSE and into a roamed-in CSE and maintain the M2M application resources for the M2M application subsequent to said detection.

According to some embodiments, a non-transitory computer readable storage medium stores a computer program including program instructions that, when executed on a processing circuit of a roamed-in CSE into which an ADN configured for an M2M application has roamed from an initial CSE, cause the processing circuit to receive a registration request from the ADN and determine that the ADN is roaming in, from the initial CSE. The instructions also cause the processing circuit to, subsequent to said determination, forward, to the initial CSE, resource requests from the ADN addressed to the roamed-in CSE.

According to some embodiments, a non-transitory computer readable storage medium stores a computer program including program instructions that, when executed on a processing circuit of an ADN configured for an M2M application and registered to an initial CSE, cause the processing circuit to cause the ADN to roam out of the initial CSE and into a roamed-in CSE. The instructions also cause the processing circuit to register with the roamed-in CSE without deregistering from the initial CSE, and before its registration times out.

According to some embodiments, a non-transitory computer readable storage medium stores a computer program for maintaining resources for an M2M application in an M2M system that includes an ADN configured for the M2M application and registered to an initial CSE. The computer program includes program instructions that, when executed on one or more processing circuits of the M2M system, cause the one or more processing circuits to store M2M application resources for the ADN in the initial CSE. The instructions also cause the processing circuits to cause the ADN to roam out of the initial CSE and into a roamed-in CSE and register the ADN with the roamed-in CSE without deregistering the ADN from the initial CSE, and before its registration times out. The instructions cause the processing circuits to maintain the M2M application resources for the M2M application at the initial CSE subsequent to the initial CSE detecting that the ADN has roamed out of the initial CSE and into the roamed-in CSE and forward, to the initial CSE, resource requests from the ADN addressed to the roamed-in CSE.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
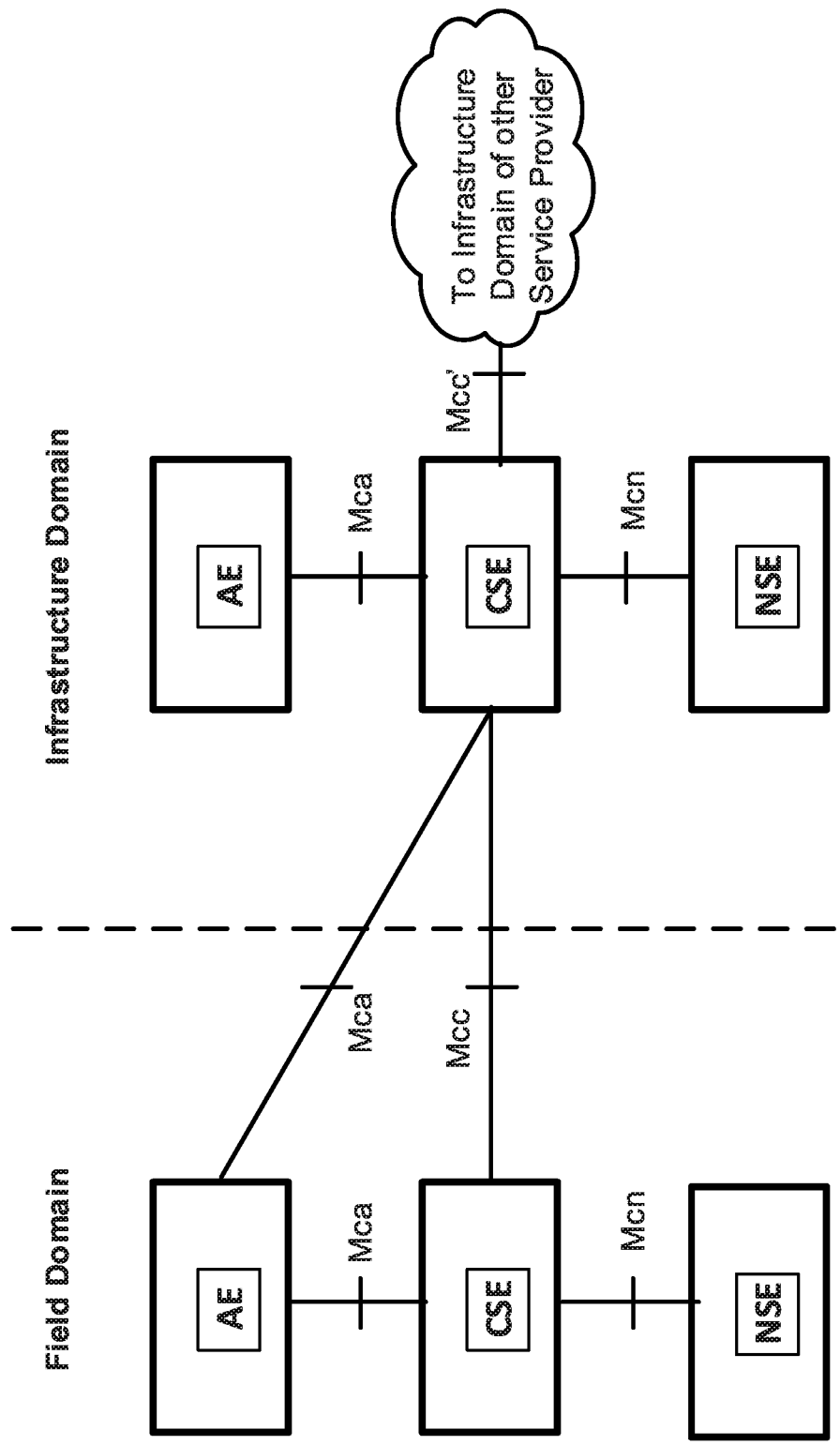
FIG. 1 is a diagram of oneM2M architecture.
Figure 2:
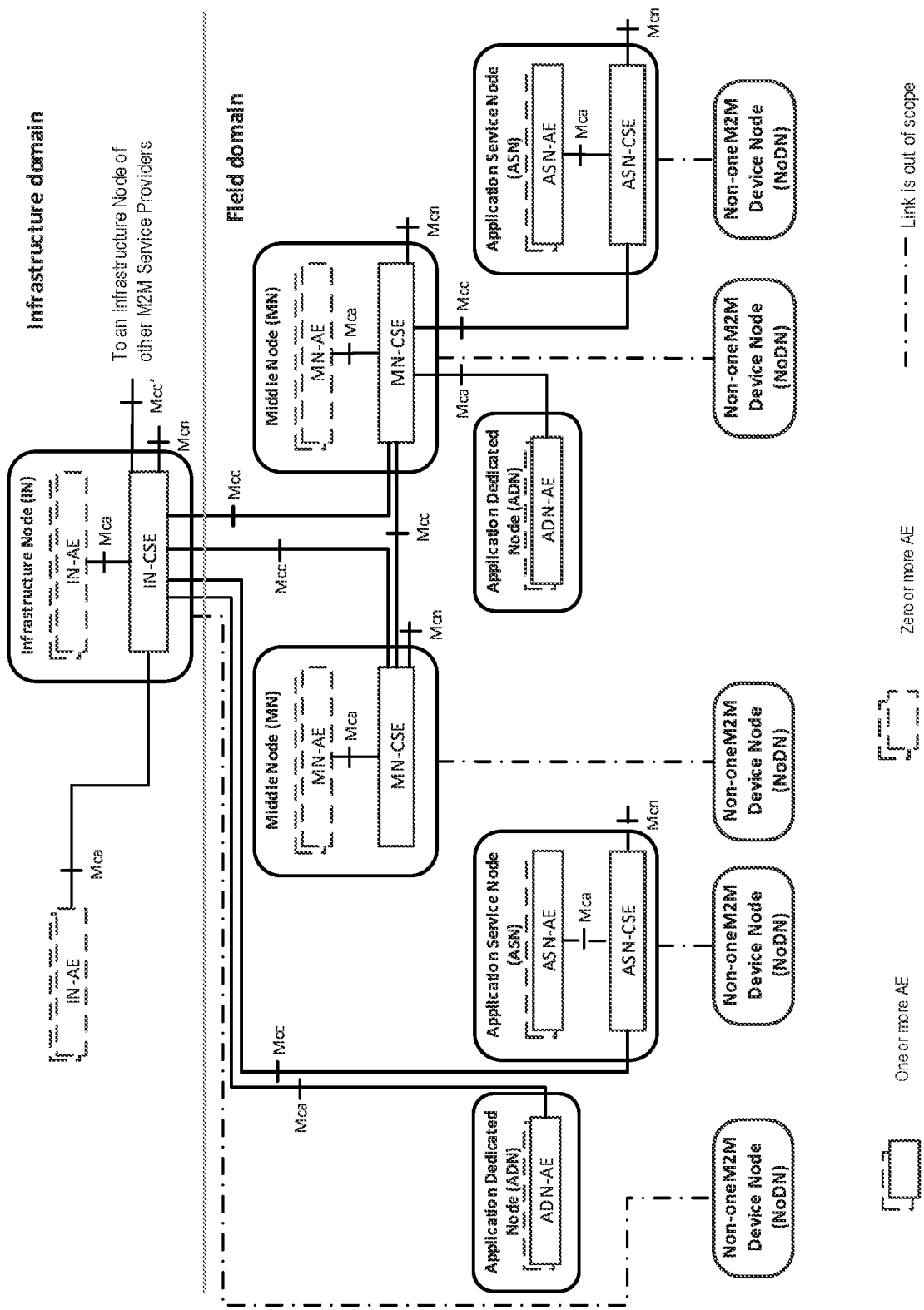
FIG. 2 is a diagram of configurations supported by oneM2M architecture.
Figure 3:
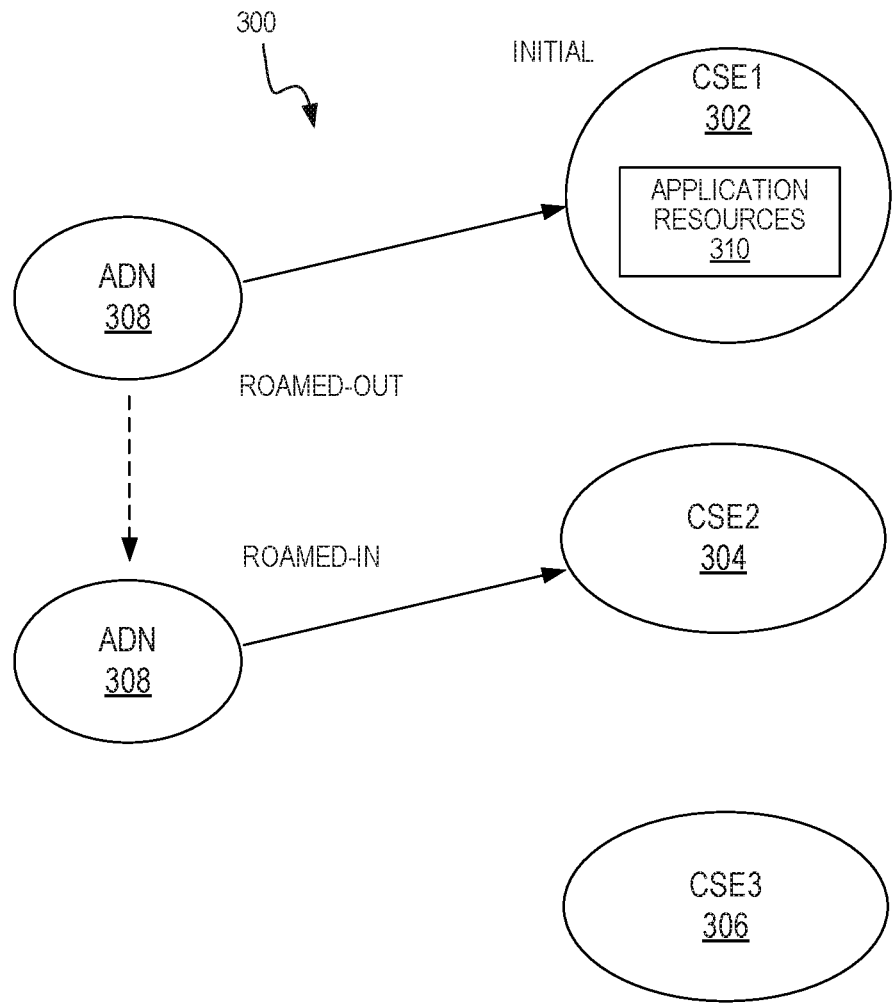
FIG. 3 illustrates a block diagram of an ADN roaming from an initial CSE to a roamed-in CSE in an M2M system for maintaining resources at an initial CSE, according to some embodiments.

FIG. 3 illustrates a block diagram of an ADN 308 roaming from an initial CSE1 302 to a roamed-in CSE2 304 in an M2M system 300 for maintaining resources at the initial CSE1 302, according to some embodiments. The ADN 308 initially registers with the initial CSE 302 and M2M application resources 310 for the ADN 308 are stored at the initial CSE 302. After roaming out of the initial CSE1 302 and into a roamed-in CSE2 304, the ADN 308 registers with the roamed-in CSE2 304. However, the M2M application resources 310 are maintained at the initial CSE1 302. FIG. 3 also shows another CSE3 306 in the M2M system 300. Resource requests are forwarded to the initial CSE1 302. Resource requests may include requests to store or store M2M application resources 310 or to modify, delete, add to or read stored M2M application resources 310.

Figure 4:
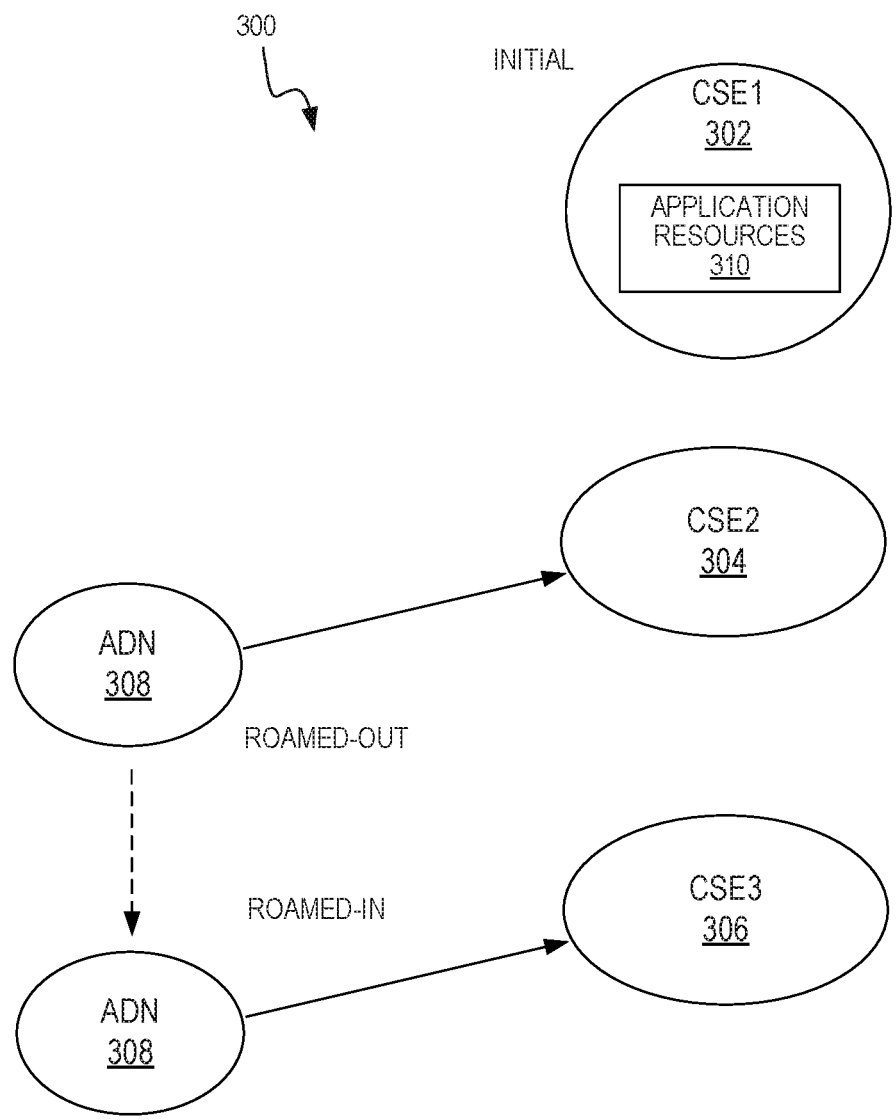
FIG. 4 illustrates the ADN roaming out of the roamed-in CSE and into a new roamed-in CSE.

FIG. 4 illustrates the ADN 308 roaming out of the roamed-in CSE2 304 and into a new roamed-in CSE3 306. After roaming out of the CSE2 304, the ADN 308 registers with the new roamed-in CSE2 306. Again, the M2M application resources 310 are maintained at the initial CSE1 302. Application resource requests are forwarded to the initial CSE1 302. In this example, the CSE2 304 has played the role of both roamed-in CSE and roamed-out CSE.

Figure 5:
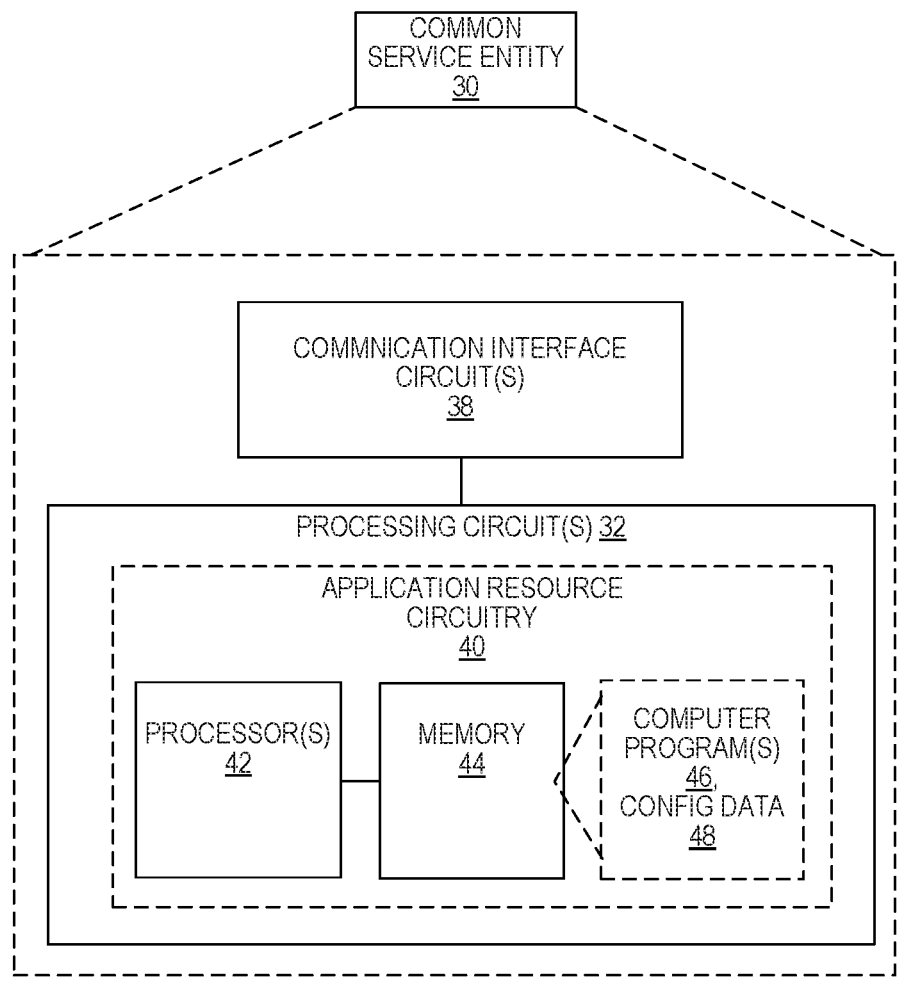
FIG. 5 illustrates a block diagram of a CSE configured to maintain resources at an initial CSE, according to some embodiments.

FIG. 5 illustrates a diagram of a CSE 30, according to some embodiments. The CSE 30 includes a communication interface circuit(s) 38 in order to communicate with network nodes, peer nodes, or to provide an air interface to wireless devices, e.g., an LTE air interface for downlink transmission and uplink reception, which is implemented via antennas and a transceiver circuit. The transceiver circuit may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The CSE 30 also includes one or more processing circuits 32 that are operatively associated with the communication interface circuit 38. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the CSE 30.

In some embodiments, the processor 42 executes a computer program 46 stored in the memory 44 that configures the processor 42 to perform operations of an initial CSE. The processor 42 is configured to store M2M application resources for an ADN registered to the initial CSE and configured for the M2M application. The processor 42 may be configured to detect that the ADN has roamed out of the initial CSE and into a roamed-in CSE and maintain the M2M application resources for the M2M application subsequent to said detecting. This structure and functionality may be referred to as application resource circuitry 40 in the processing circuit 32.

Figure 7:
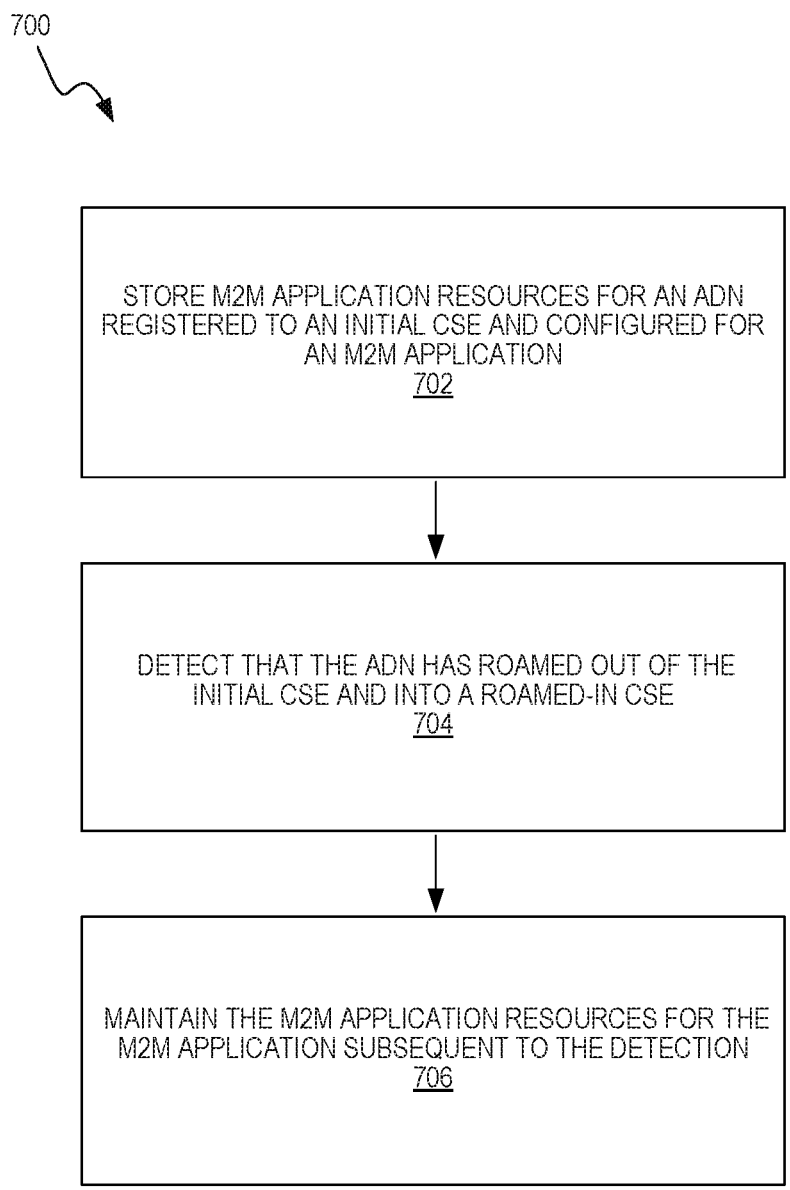
FIG. 7 illustrates a method in an initial CSE configured to maintain resources for an M2M application, according to some embodiments.

The processing circuit 32 of the CSE 30 is configured to perform a method for maintaining resources for an M2M application, such as method 700 of FIG. 7. The method 700 includes storing M2M application resources 310 for an ADN 308 registered to the initial CSE1 302 and configured for the M2M application (block 702). The method 700 also includes detecting that the ADN 308 has roamed out of the initial CSE1 302 and into a roamed-in CSE2 304 (block 704). The detecting may include receiving notifications or messages from roamed in or roamed out CSEs. Detection may also include determining that the ADN 308 is directing requests to another CSE or that forwarded requests are being received from another CSE.

The method 700 further includes maintaining the M2M application resources 310 for the M2M application subsequent to said detecting (block 706). The resources for the ADN 308 or application are stored in memory 44 or other storage means at the initial CSE1 302. The resources will be maintained as long as the initial CSE1 302 knows that the ADN 308 exists and has not affirmatively deregistered from the initial CSE1 302, the ADN 308 has otherwise indicated that it wishes to deregister from all CSEs, or the registration of the ADN 308 did not time-out in any CSE and is being refreshed by ADN 308.

Resource requests are forwarded to the initial CSE1 302 from other CSEs. The resource requests may include store resource requests to store a new M2M application resource 310 and the initial CSE1 302 is configured to store the new M2M application resource 310 for the ADN 308 at the initial CSE1 302. In some cases, this may include a request to create and the corresponding creation of a new M2M application resource.

Resource requests may include modify resource requests to modify or add to a stored M2M application resource 310. The initial CSE1 302 is configured to modify or add to the stored M2M application resource 310 for the ADN 308 at the initial CSE1 302.

Resource requests may include read resource requests to read or retrieve a stored M2M application resource 310. The initial CSE1 302 is configured to provide the stored M2M application resource 310 to the requesting ADN, such as ADN 308 or any other ADN, responsive to receiving the read resource request.

Resource requests may include delete resource requests to delete a stored M2M application resource 310. The initial CSE1 302 is configured to delete the stored M2M application resource 310 for the ADN 308 at the initial CSE1 302.

Resource requests may include subscription resource requests to subscribe the ADN 308 to a stored M2M application resource 310 for one or more events associated with the stored M2M application resource 310. The initial CSE1 302 is configured to subscribe the ADN 308 to the stored M2M application resource 310 for associated events at the initial CSE1 302. Subscription requests may also include requests to modify or delete a subscription. The initial CSE1 302 is also configured to generate notifications, including when subscriptions for events have been fulfilled. These notifications may be sent to the ADN 308 or a CSE that forwarded the subscription request to the initial CSE1 302.

It is noted that the resource requests are not limited to the examples provided herein and may include any other operations that may be performed or supported by a CSE.

In some embodiments, the processor 42 executes a computer program 46 stored in the memory 44 that configures the processor 42 to perform operations of a roamed-in CSE. The processor 42 is configured to receive a registration request from the ADN 308. The processor 42 is also configured to determine that the ADN 308 is roaming in, from an initial CSE1 302, and subsequent to said determining, forward, to the initial CSE1 302, resource requests from the ADN 308 addressed to the roamed-in CSE2 304. This structure and functionality may also be included in the application resource circuitry 40 in the processing circuit 32.

Figure 8:
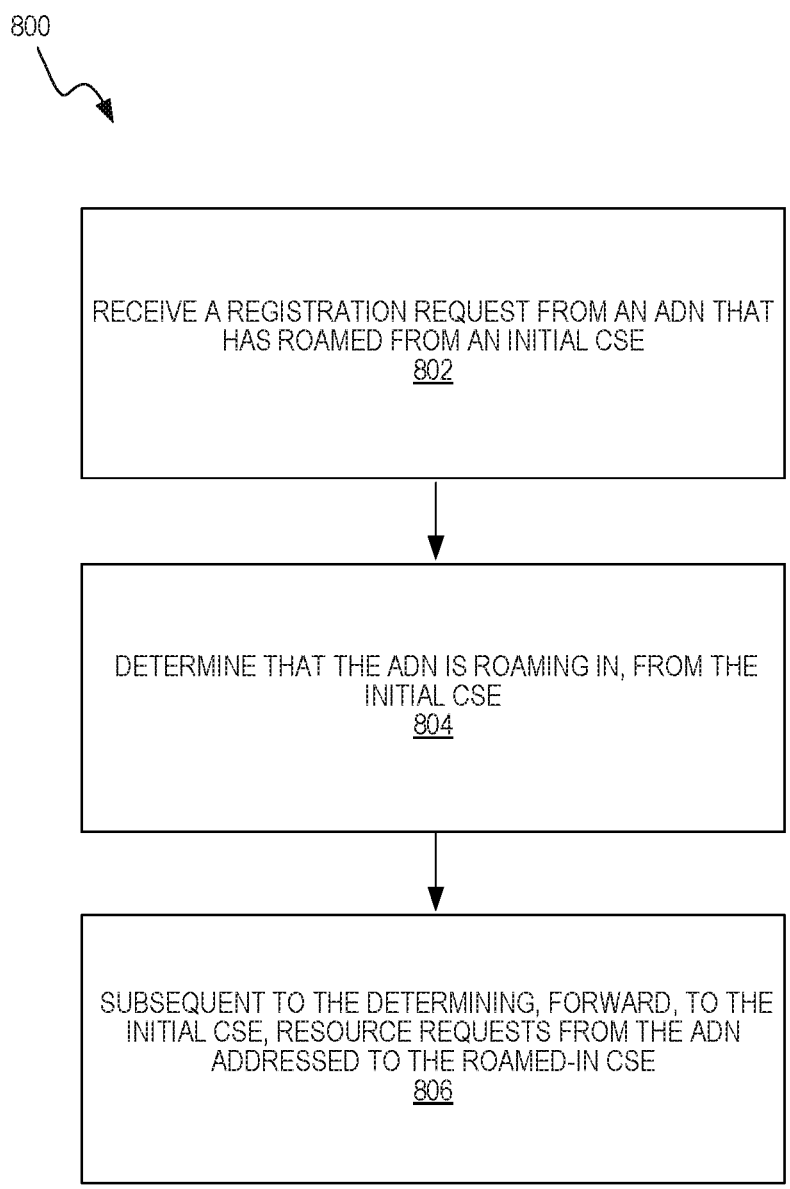
FIG. 8 illustrates a method in a roamed-in CSE, according to some embodiments.

In that regard, the processing circuit 32 of the CSE 30 is configured to perform a method, such as method 800 of FIG. 8. The method 800 includes receiving a registration request from the ADN 308 (block 802) and determining that the ADN 308 is roaming in, from the initial CSE1 302 (block 804). A notification of the roaming-in status may be sent to the initial CSE 302. The method 800 also includes, subsequent to said determining, forwarding, to the initial CSE1 302, resource requests from the ADN 308 addressed to the roamed-in CSE 304 (block 806). Requests targeted to resources of the ADN 308 are forwarded to the initial CSE1 302. Requests targeting the ADN 308 or application itself are handled by the respective CSE, such as roamed-in CSE2 304 and will be forwarded by the initial CSE1 302 to the roamed-in CSE2 304, where the ADN 308 is roaming.

Figure 6:
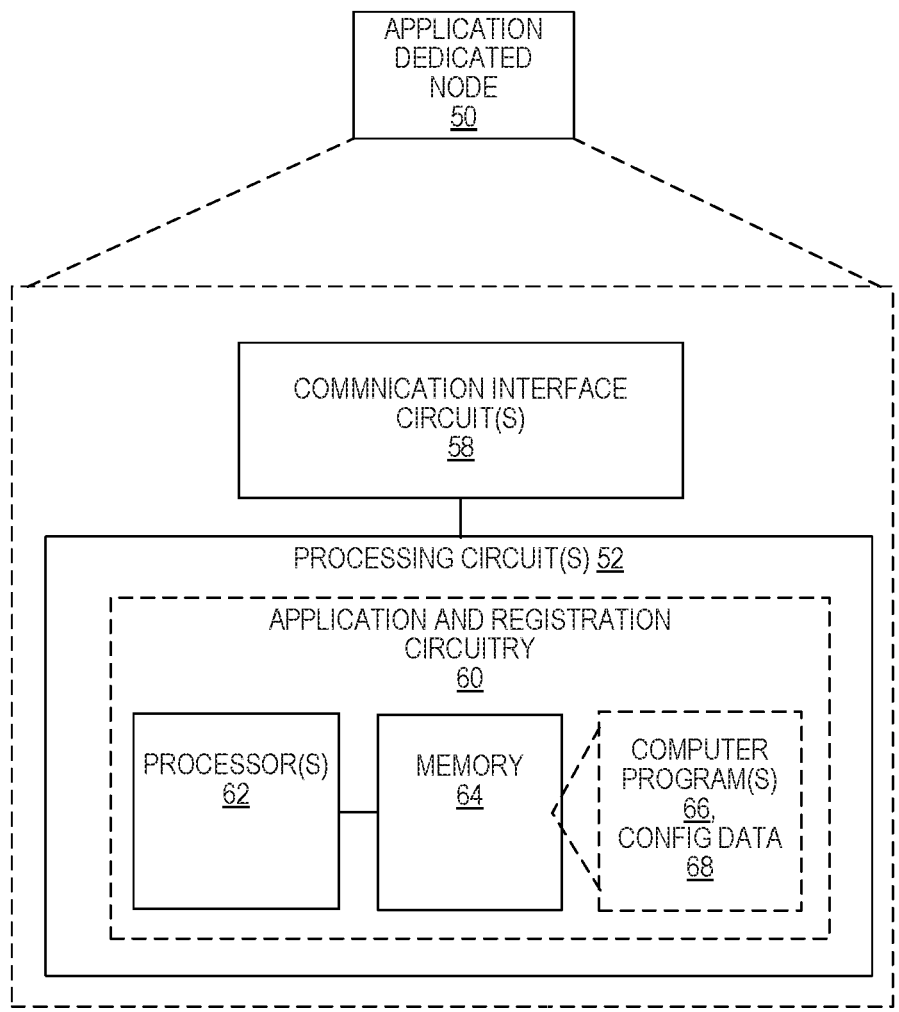
FIG. 6 illustrates a block diagram of an ADN configured for an M2M application, according to some embodiments.

FIG. 6 illustrates a diagram of an ADN configured for one or more M2M applications, such ADN 50, according to some embodiments. To ease explanation, the ADN 50 may also be considered to represent any wireless devices that perform M2M communications or machine-type communication (MTC). The ADN 50 communicates with a radio node, base station, access point or another node, via antennas and a transceiver circuit or other circuitry of a communication interface 58. The transceiver circuit may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The ADN 50 also includes one or more processing circuits 52 that are operatively associated with the communication interface circuit 58. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The processor 62 of the processor circuit 52 may execute a computer program 66 stored in the memory 64 that configures the processor 62 to roam the ADN 308 out of the initial CSE1 302 and into a roamed-in CSE2 304 and register with the roamed-in CSE2 304 without deregistering from the initial CSE1 302, and before its registration with the initial CSE1 302 times out. This functionality may be performed by application and registration circuitry 60 in processing circuit 52.

Figure 9:
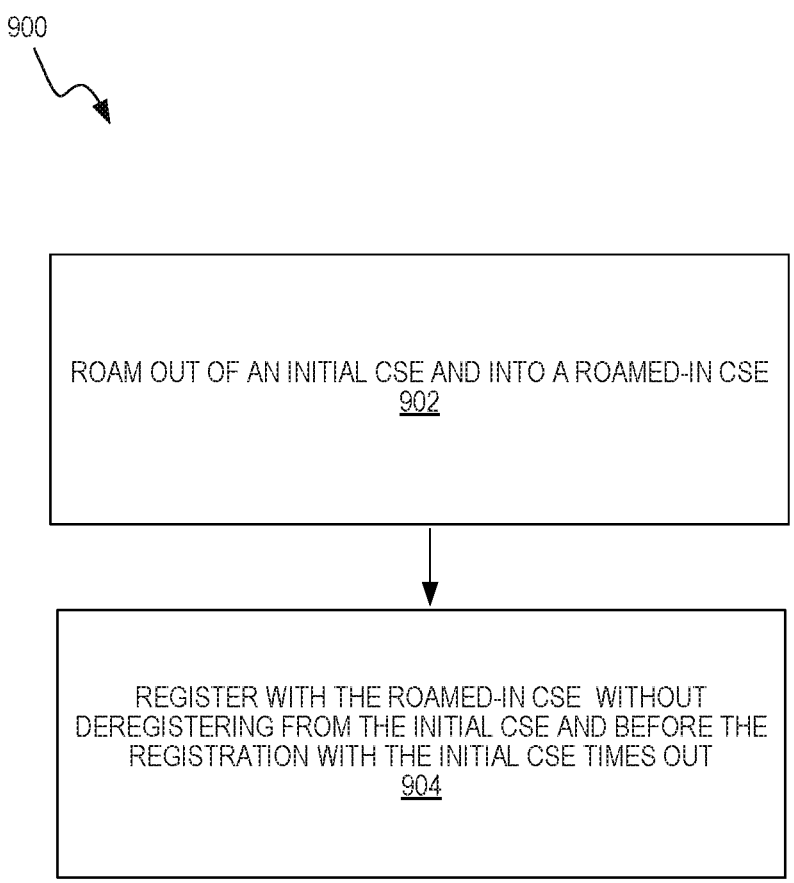
FIG. 9 illustrates a method in an ADN configured for an M2M application, according to some embodiments.
Figure 10:
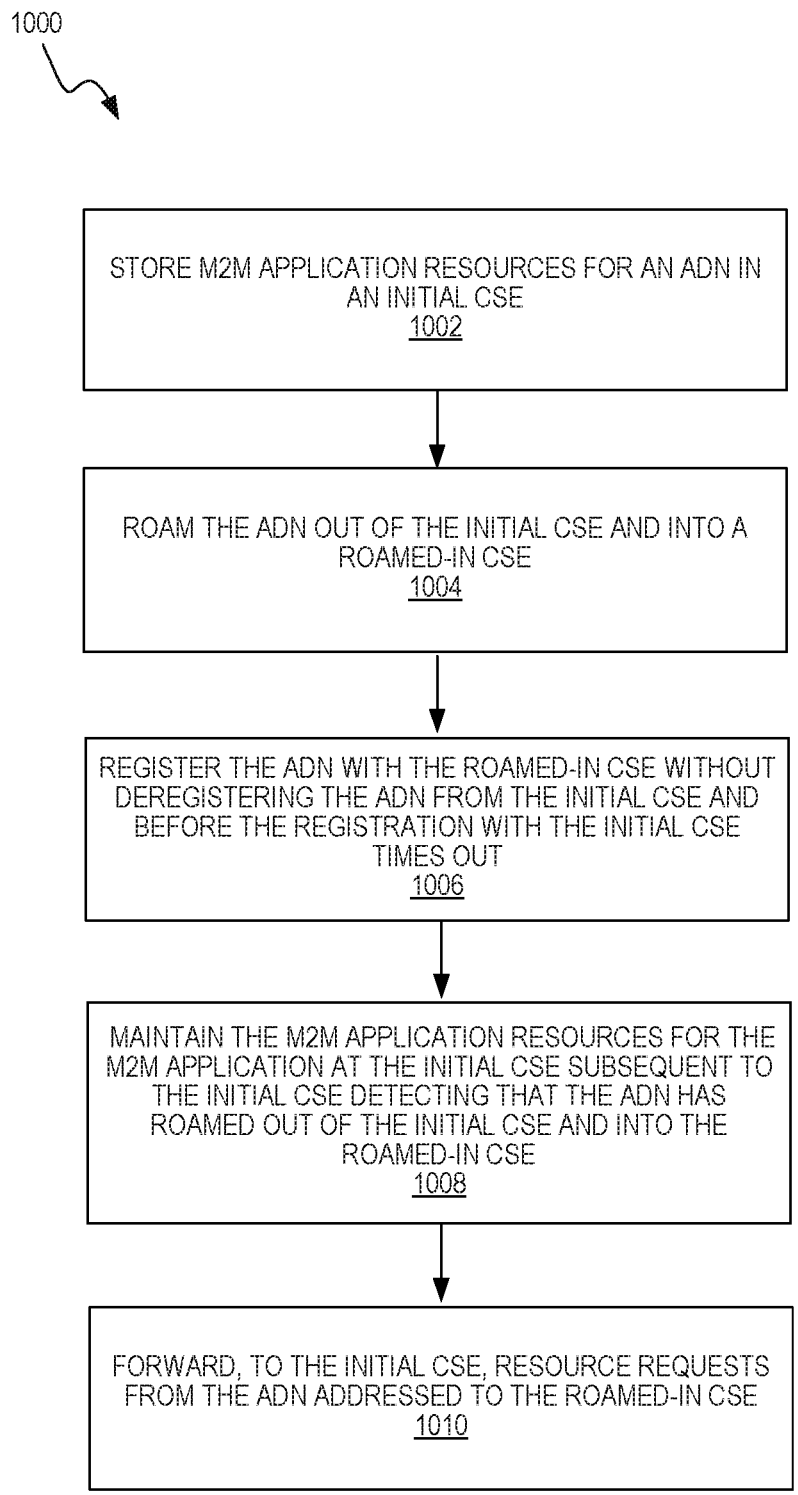
FIG. 10 illustrates a method in an M2M system configured to maintain resources at an initial CSE, according to some embodiments.

The processing circuit 62 of the ADN 50 is configured to perform a method, such as method 900 of FIG. 9. The ADN 50 is configured for an M2M application and registered to an initial CSE1 302. The method 900 includes roaming out of the initial CSE1 302 and into a roamed-in CSE2 304 (block 902). The method also includes registering with the roamed-in CSE2 304 without deregistering from the initial CSE1 302 (block 904) and before its registration with the initial CSE1 302 times out.

The ADN 50 may be configured to cause itself to roam out of the roamed-in CSE2 304 and into a new roamed-in CSE3 306 and to register with the new roamed-in CSE3 306. The ADN 50 can send a registration message indicating an initial CSE1 302 and a CSE from which the ADN 50 roamed out. The ADN 50 is configured to perform the above step without deregistering and before its registration with the initial CSE1 302 times out. This new registration can also be performed before registration with any later roamed-out CSEs time out, such as roamed-out CSE2 304. The initial CSE1 302 and any roamed-out CSEs, such as the roamed-out CSE2 304, may time out at the same time.

The processing circuits 32 and 52 of CSEs 302 and 304 and ADN 308 perform a method 1000 for operating M2M system 300 to maintain M2M application resources 310 at the initial CSE1 302, according to some embodiments. The method 1000 includes storing M2M application resources 310 for the ADN 308 in the initial CSE1 302 (block 1002). The method 1000 includes the ADN 308 roaming out of the initial CSE1 302 and into a roamed-in CSE2 304 (block 1004). The method 1000 also includes registering the ADN 308 with the roamed-in CSE2 304 without deregistering the ADN 308 from the initial CSE1 302, and before its registration with the initial CSE1 302 times out (block 1006). The application registration with the new CSE (roamed-in CSE2 304) implicitly assumes the registration with the initial CSE1 302 continues as if the registration with the initial CSE1 302 is refreshed. This applies as long as the ADN 308 did not de-register from the initial CSE1 302 and the registration has not expired.

The method 1000 includes maintaining the M2M application resources 310 for the M2M application at the initial CSE1 302 subsequent to the initial CSE1 302 detecting that the ADN 308 has roamed out of the initial CSE1 302 and into the roamed-in CSE2 304 (block 1008). The method 1000 further includes forwarding, to the initial CSE1 302, resource requests from the ADN 308 addressed to the roamed-in CSE2 304 (block 1010). The initial CSE1 302 and the roamed-in CSE2 304 will cooperate to ensure that when the ADN 308 sends requests to the roamed-in CSE2 304 to perform any M2M resource request permissible operation (e.g., create, store, modify, add to, read, delete, or subscribe to), and the roamed-in CSE2 304 forwards these requests to the initial CSE1 302 where the M2M application resources 310 continue to be stored. In addition, resource requests arriving to the initial CSE1 302 targeting the ADN 308 (such as notifications for example), will be forwarded by the initial CSE1 302 to the new CSE2 304 where the ADN 308 is currently registered. This applies to notifications which target the ADN 308 itself.

If the ADN 308 left the CSE2 304 to register with yet another CSE (CSE3 306), the latest CSE3 306 will communicate with the initial CSE1 302 via the old roamed-out CSE2 304 (that the ADN 308 left). The ADN 308 registers with the new CSE3 306 before the registration with the initial CSE1 302 times out. This may also include before time out with the CSE2 304, which may be at the same time as time out for the initial CSE1 302. Once the association between the newly roamed-in CSE3 306 and the initial CSE1 302 is established, via the roamed-out CSE2 304, the roamed-out CSE2 304 removes itself from the picture. That is the ADN 308 deregisters CSE2 304. Notifications to an initial CSE, by either the ADN or the roamed-out CSE, include information identifying the initial CSE and the roamed-out CSE. In this example, a notification would identify the initial CSE1 302 and the roamed-out CSE2 304. In some cases, the roamed-out CSE is also the initial CSE.

Figure 11:
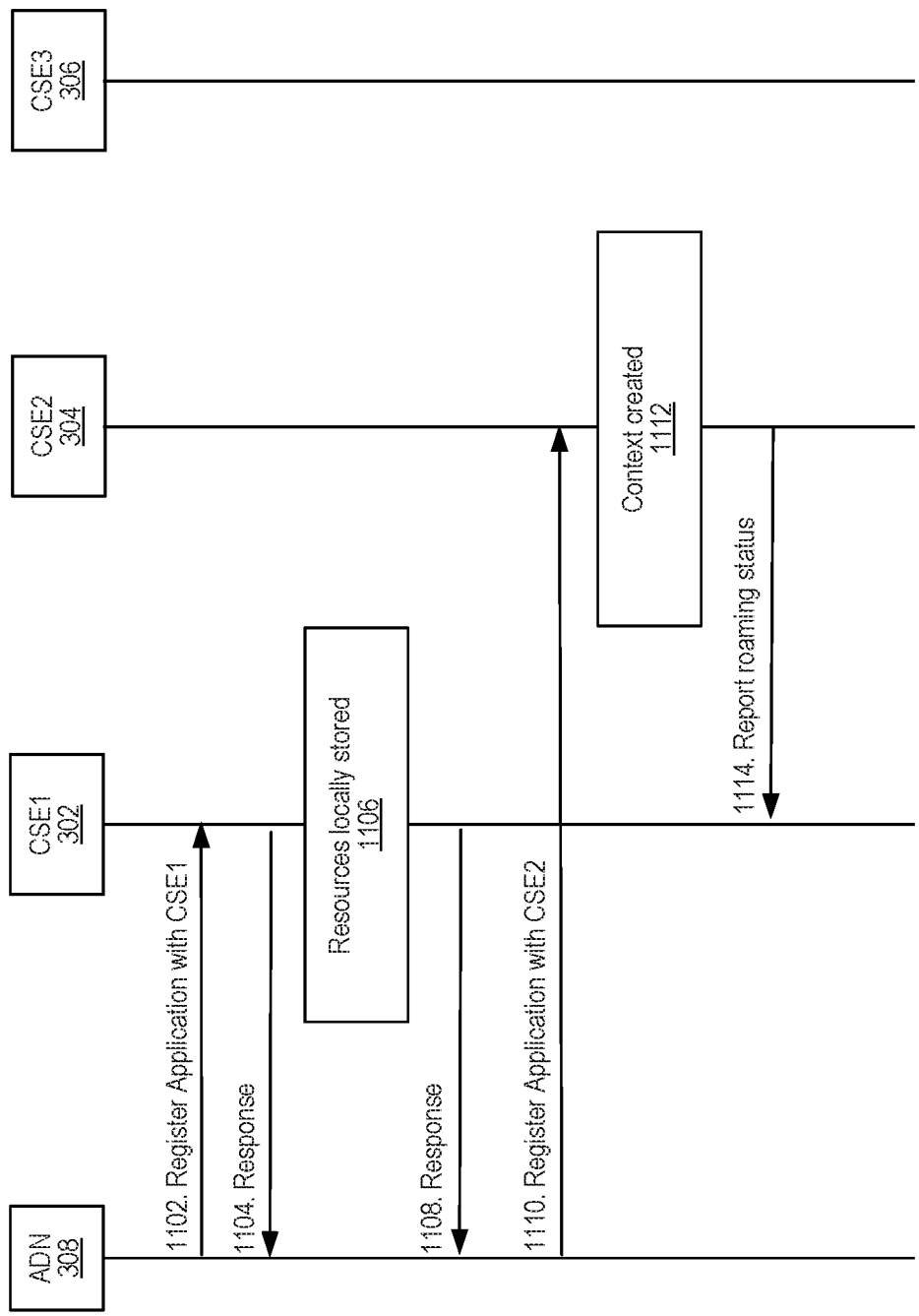
FIGS. 11-12 illustrate a procedure of an ADN roaming from an initial CSE to another CSE, while maintaining resources at the initial CSE, according to some embodiments.
Figure 12:
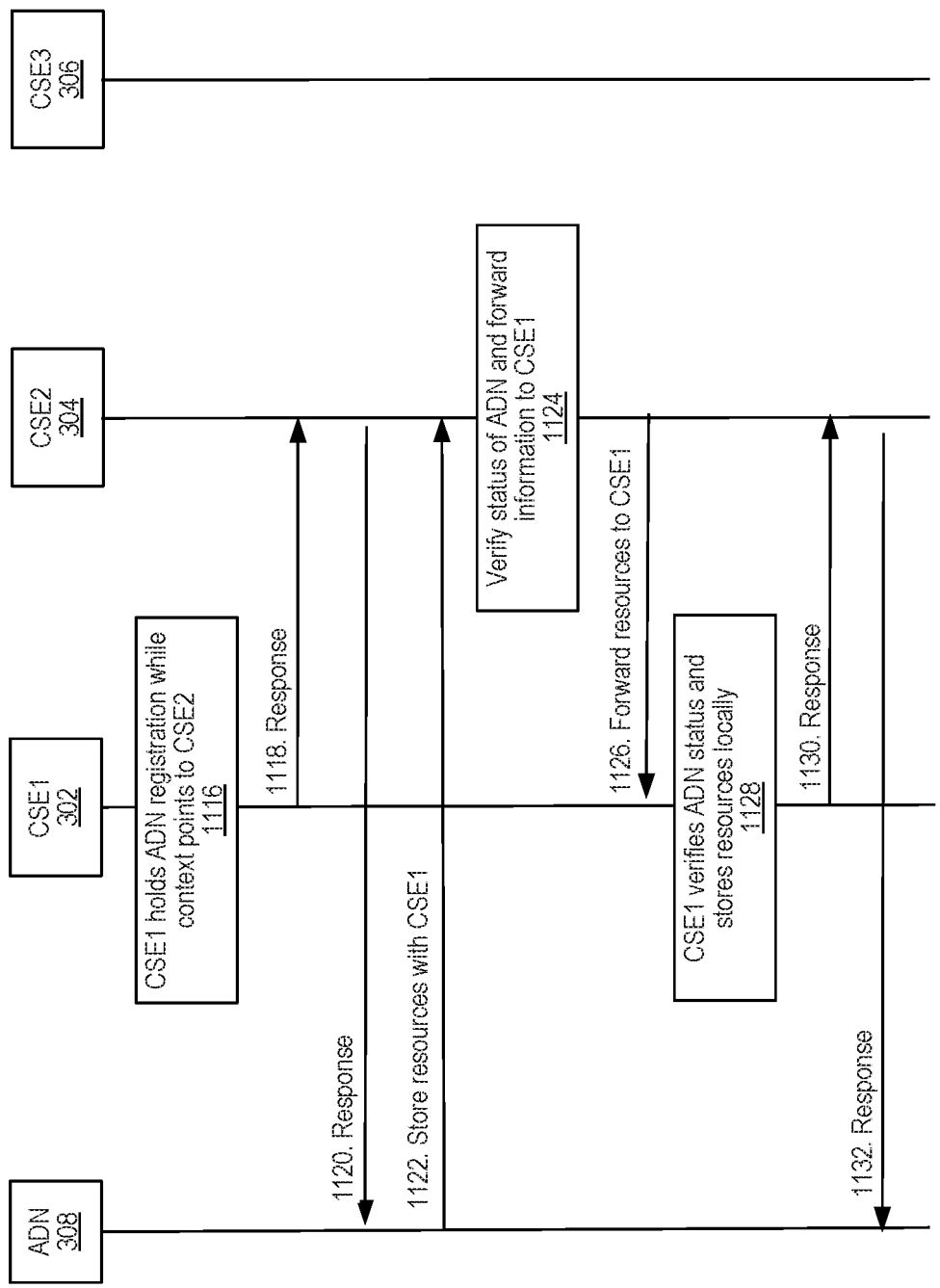

FIGS. 11 and 12 illustrate example call flows in an M2M system configured to maintain resources at an initial CSE to supplement the explanation of the methods 700-1000. At operation 1102, the ADN 308 registers with the initial CSE1 302. A response is sent from the initial CSE1 302 to the ADN 308 (operation 1104). Resources for the ADN 308, or any M2M application the ADN 308 is configured for, are stored locally at the initial CSE1 302 (operation 1106). The resources are accessible by other applications or ADNs in other CSEs. The resources can also be announced in any CSE. A response for storing the resources, or any other resource related operation (e.g., create, store, modify, add to, read, delete, subscribe to) initiated by ADN 308 is sent to the ADN 308 from the initial CSE1 302 (operation 1108).

When the ADN 308 roams out of the initial CSE1 302 and into roamed-in CSE2 304, the ADN 308 is registered with the roamed-in CSE2 304 (operation 1110). A context is created for the ADN 308 in the roamed-in CSE2 304 (operation 1112). However, the roamed-in CSE2 304 always points to the initial CSE1 302 for any targeting of resources of the ADN 308. The roamed-in CSE2 304 will handle requests targeting the ADN 308 or application itself. The roaming status of the ADN 308 is reported from the roamed-in CSE2 304 to the initial CSE1 302 (operation 1114).

At operation 1116 in FIG. 12, the initial CSE1 302 will verify from the ADN 308 subscription profile that the ADN 308 is a roaming application that is entitled to the service. Assuming a successful verification, the initial CSE1 302 continues to hold the registration for the ADN 308 and the resources. However, the context for the ADN 308 changes to roaming with a pointer to the new CSE location (CSE2 304). It may be that the ADN 308 is unaware that the initial CSE1 302 is still holding its registration or that resource requests are being forwarded to the initial CSE1 302. At operations 1118 and 1120, responses are sent from the initial CSE1 302 to the roamed-in CSE2 304 and from the roamed-in CSE2 304 to the ADN 308 to confirm ADN 308 registration with CSE2 304

The call flow of FIG. 12 also shows the actions that take place subsequent to when the application ADN 308 sends a request to the CSE2 304 to store resources (operation 1122). The CSE2 304 verifies the status of the ADN 308 and forwards information to the initial CSE1 302 (operation 1124). Resources are forwarded to the initial CSE1 302 (operation 1126). The initial CSE1 302 verifies the ADN 308 status and stores the resources (operation 1128). Responses are sent from the initial CSE1 302 to the requesting CSE2 304 and from the requesting CSE2 304 to the ADN 308 (operations 1130 and 1132).

It can be noted that when the ADN 308 registers with the new CSE2 304, it sends to the new CSE2 304, in addition to all the necessary information currently defined in the oneM2M specification, information for the initial CSE1 302 and the roamed-out CSE. This allows the roamed-in CSE to contact the roamed-out CSE (initial CSE1 302 in this call flow) and establish the necessary binding.

Figure 13:
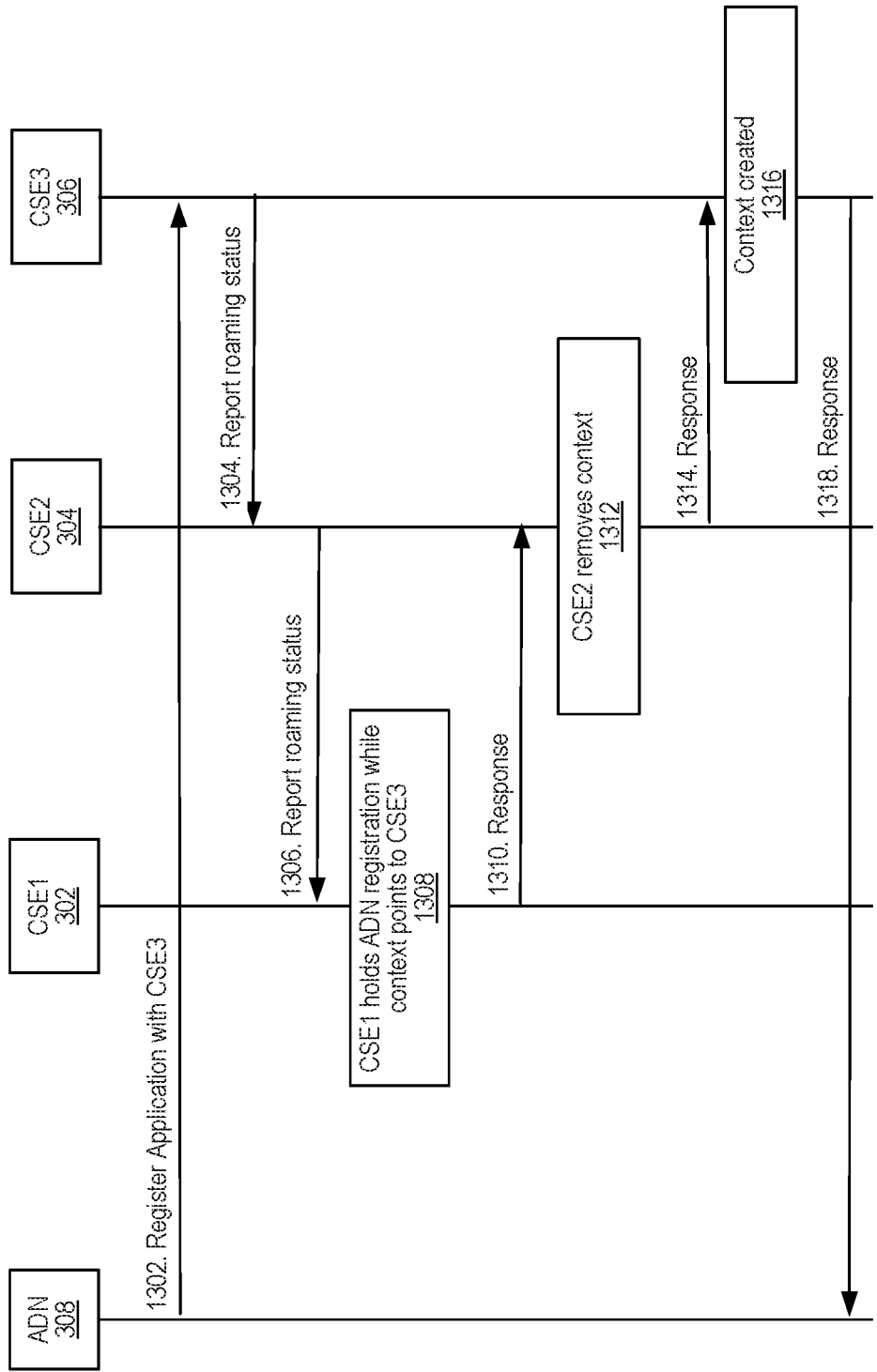
FIG. 13 illustrates a procedure of an ADN roaming to yet another CSE, according to some embodiments.

The call flow of FIG. 13 shows, according to some embodiments, operations for when the ADN 308 roams out of the CSE2 304 and into a new roamed-in CSE3 306 for which it registers. At operation 1302, the application is registered with the new roamed-in CSE3 306. This may involve messaging indicating the initial CSE1 302 and the roamed-out CSE, which is roamed-out CSE2 304. The roaming status is reported from CSE3 306 to CSE2 304 and from CSE2 304 to CSE1 302 (operations 1304 and 1306). The CSE1 continues to hold the ADN 308 registration and resources (operation 1308). The context changes to roaming with a pointer to new roamed-in CSE3 306. Again, the ADN 308 may be unaware of context or pointer changes of the CSEs. A response is sent from the initial CSE1 302 to the CSE2 304 (operation 1310). The CSE2 removes its context for the ADN 308 (operation 1312). A response is sent from the CSE2 304 to the CSE3 306 (operation 1314). It is noted that the CSE2 304 removes everything related to the ADN 308 once the interactions with the CSE3 306 are completed.

The CSE3 knows this is a roaming application and creates a context for the ADN 308 (operation 1316). The context always point to the initial CSE1 302 for any ADN 308 resources that are targeted. The CSE3 306 handles requests targeted to the ADN 308 or application itself. A response is sent from the CSE3 306 to the ADN 308 to confirm the registration of the ADN 308 with the CSE3 306. Requests from the ADN 308 are forwarded to the initial CSE1 302 via the CSE3 306. The mobility of the ADN 308 is transparent to all applications, nodes or entities that want to reach the resources of the ADN 308.

Figure 14:
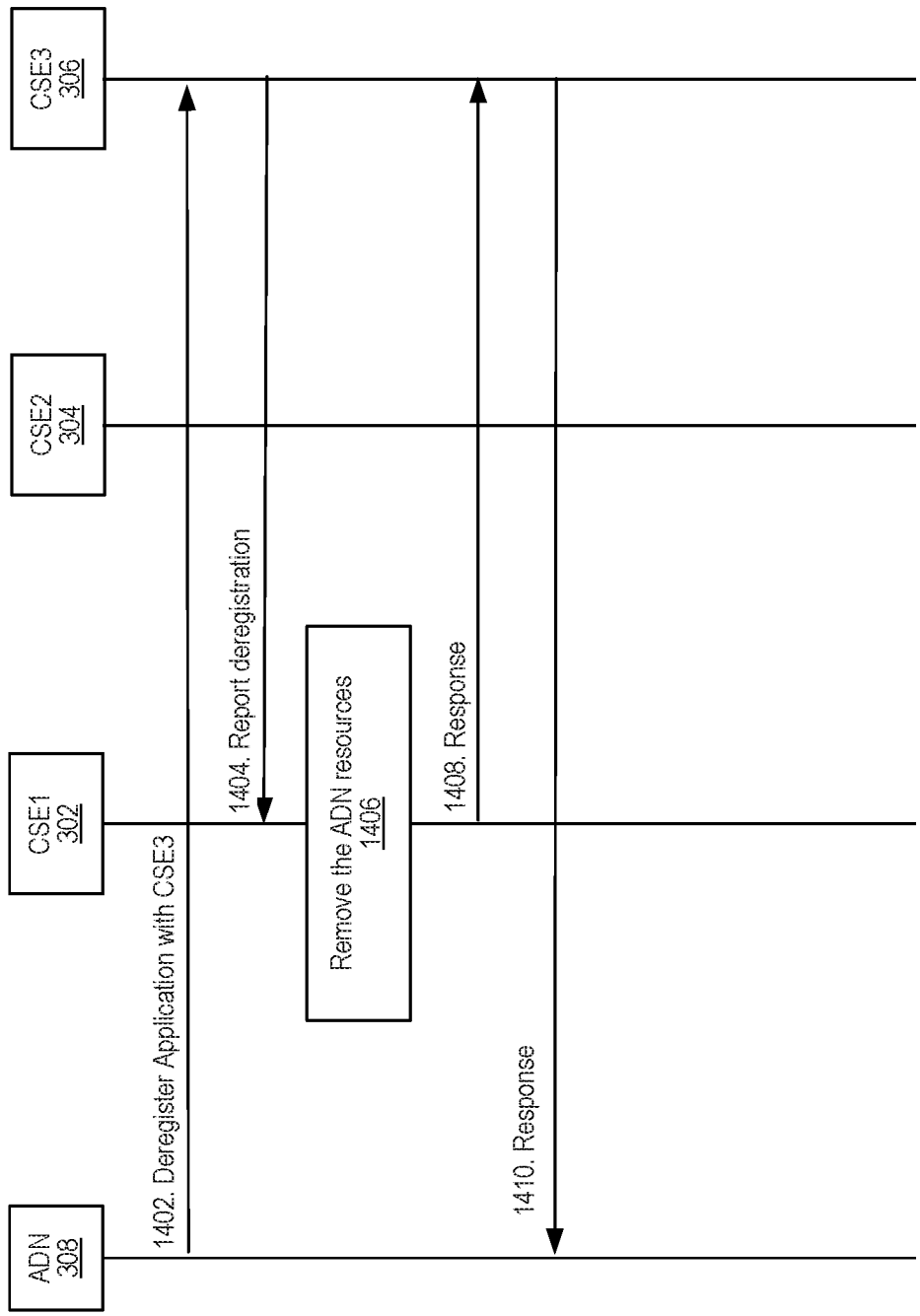
FIG. 14 illustrates a procedure of an ADN deregistering from a CSE, according to some embodiments.

FIG. 14 illustrates a call flow showing deregistration of the ADN 308 from the CSE3 306, according to some embodiments. At operation 1402, the ADN 308 deregisters with the CSE3 306. Deregistration is reported to the initial CSE1 302 (operation 1404). The initial CSE1 302 removes the resources of the ADN 308 (operation 1406). A response is sent from the initial CSE1 302 to the CSE3 306 (operation 1408). The CSE3 306 sends a response to the ADN 308 (operation 1410) confirming deregistration of the ADN 308. Note that the same procedure will be undertaken by the ADN 308 if the ADN 308 did not refresh its registration and the CSE3 306 did not receive any report from another CSE related to the ADN 308 registration.

Figure 15:
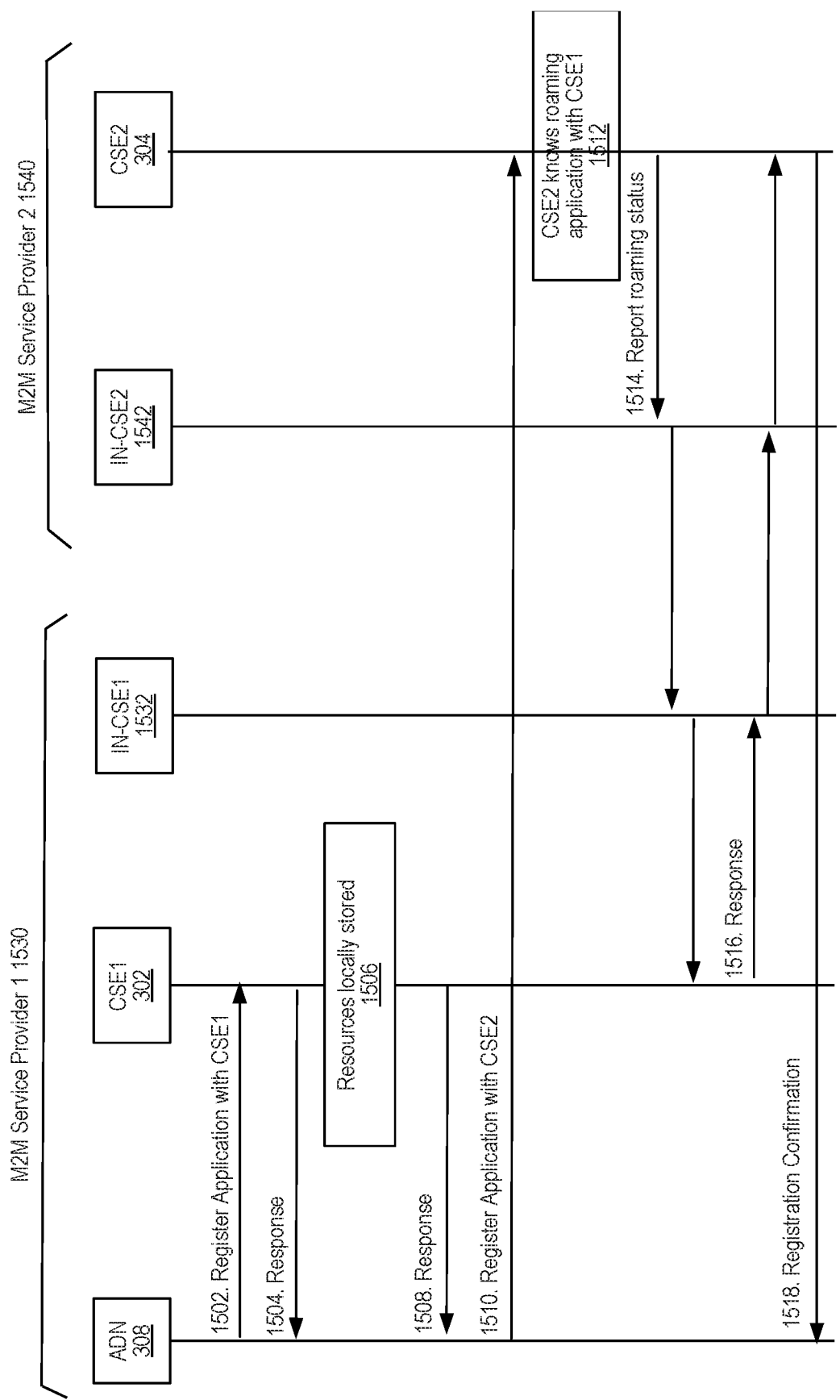
FIG. 15 illustrates a procedure of an ADN roaming from one CSE to another CSE in another M2M domain, according to some embodiments.

The same approach may be applied when the ADN 308 roams between two different domains. For example, as shown in the call flow of FIG. 15, at operation 1502, the ADN 308 registers with the initial CSE1 302. A response is sent (operation 1504). Resources for the ADN 308, or any M2M application the ADN 308 is configured for, are stored locally at the initial CSE1 302 (operation 1506). A response for storing the resources is sent to the ADN 308 (operation 1508).

However, in this case when the ADN 308 roams out of the initial CSE1 302 and into the new roamed-in CSE2 304, the request from the roamed-in domain of the second M2M service provider (SP) will have to go to the IN-CSE2 1542 of the second M2M SP 2 1540 to the IN-CSE1 1532 of the first M2M SP1 1530. The ADN 308 registers with the CSE2 304 (operation 1510). The CSE2 304 knows the ADN 308 is a roaming application registered with the initial CSE1 302 (operation 1512). The roaming status is reported (operation 1514), but the signaling passes through the IN-CSE2 1542 to the IN-CSE1 1532. The response (operation 1516) is sent from the initial CSE1 302 to the IN-CSE1 1532 to the IN-CSE2 1542 to the CSE2 304. The CSE2 304 then forwards the registration confirmation to the ADN 308 (operation 1518).

Figure 16:
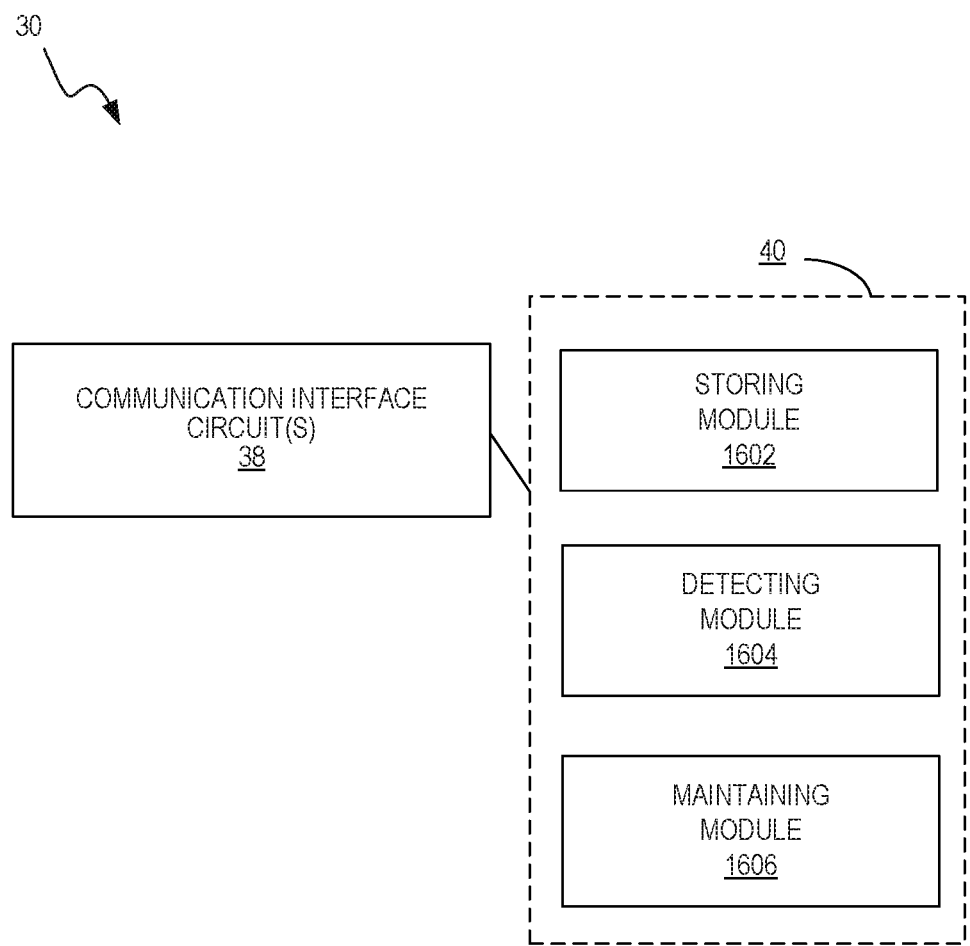
FIG. 16 illustrates an example functional implementation of an initial CSE, according to some embodiments.

FIG. 16 illustrates an example functional module or circuit architecture as may be implemented in the CSE 30 for an initial CSE, e.g., based on the processing circuitry 20. The illustrated embodiment at least functionally includes a storing module 1602 for storing M2M application resources 310 for an ADN 308 registered to an initial CSE1 302 and configured for the M2M application. The embodiment also includes a detecting module 1604 for detecting that the ADN 308 has roamed out of the initial CSE 302 and into a roamed-in CSE2 304. The embodiment further includes a maintaining module 1606 for maintaining the M2M application resources 310 for the M2M application subsequent to said detecting.

Figure 17:
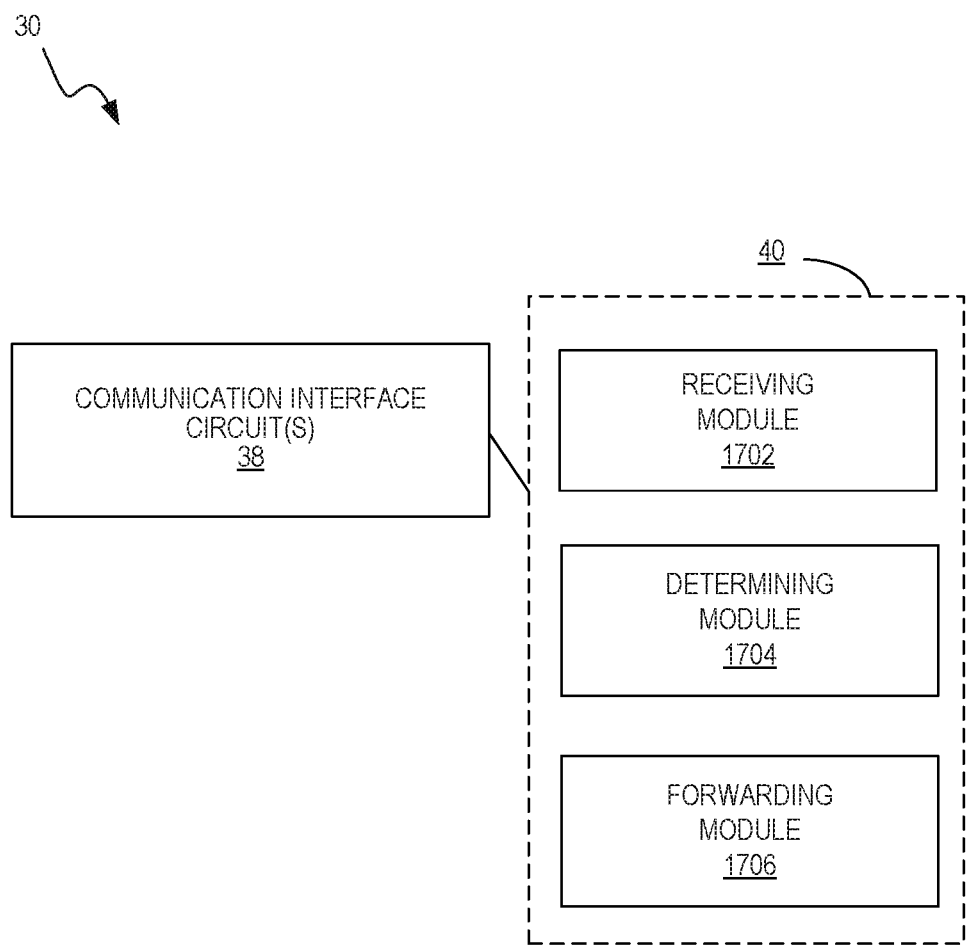
FIG. 17 illustrates an example functional implementation of a roamed-in CSE, according to some embodiments.

FIG. 17 illustrates an example functional module or circuit architecture as may be implemented in the CSE 30 for a roamed-in CSE, e.g., based on the processing circuitry 20. The illustrated embodiment at least functionally includes a receiving module 1702 for receiving a registration request from an ADN 308. The embodiment also includes a determining module 1704 for determining that the ADN 308 is roaming in, from an initial CSE1 302 or another CSE. The embodiment further includes a forwarding module 1706 for, subsequent to said determining, forwarding, to the initial CSE1 302, resource requests from the ADN 308 addressed to a roamed-in CSE, such as CSE2 304 or CSE3 306.

Figure 18:
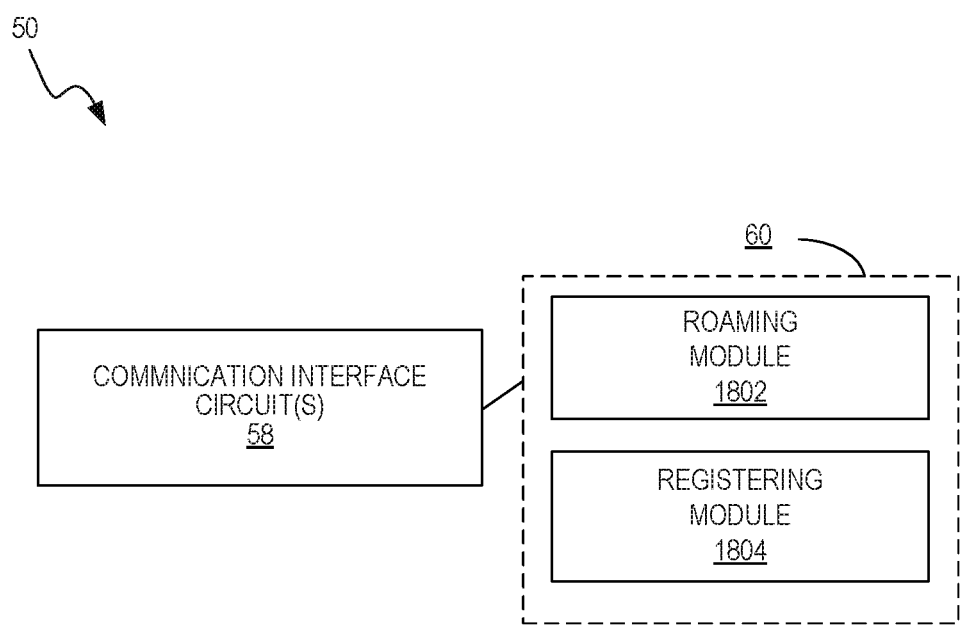
FIG. 18 illustrates an example functional implementation of an ADN, according to some embodiments.

FIG. 18 illustrates an example functional module or circuit architecture as may be implemented in an ADN 50, e.g., based on the processing circuitry 60. The illustrated embodiment at least functionally includes a roaming module 1802 for roaming out of an initial CSE1 302 and into a roamed-in CSE2 304. The embodiment also includes a registering module 1804 for registering with a roamed-in CSE2 304 without deregistering from the initial CSE1 302 and before the registration times out.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in an initial common service entity (CSE) for maintaining resources for a Machine-to-Machine (M2M) application, comprising:
    storing M2M application resources for an application dedicated node (ADN) registered to the initial CSE and configured for the M2M application;
    detecting that the ADN has roamed out of the initial CSE and into a roamed-in CSE;
    maintaining the M2M application resources for the M2M application subsequent to said detecting;
    receiving a store resource request from the roamed-in CSE, wherein the store resource request corresponds to a request by the ADN to the roamed-in CSE to store a new M2M application resource; and
    storing the new M2M application resource for the ADN at the initial CSE.

2. The method of claim 1, wherein detecting comprises receiving a notification that the ADN has roamed out of the roamed-in CSE and into a new roamed-in CSE.

3. The method of claim 1, wherein storing the new M2M application resource comprises creating the new M2M application resource.

4. The method of claim 1, further comprising:
    receiving a read resource request from the roamed-in CSE, wherein the read resource request corresponds to a request by a requesting ADN to the roamed-in CSE for a stored M2M application resource; and
    providing the stored M2M application resource to the requesting ADN responsive to the received read resource request.

5. The method of claim 1, further comprising:
    receiving a delete resource request from the roamed-in CSE, wherein the delete resource request corresponds to a request by a requesting ADN to the roamed-in CSE to delete a stored M2M application resource; and
    deleting the stored M2M application resource responsive to the received delete resource request.

6. The method of claim 1, further comprising:
receiving a subscription resource request from the roamed-in CSE, wherein the subscription resource request corresponds to a request by a requesting ADN to the roamed-in CSE to subscribe to a stored M2M application resource, modify an existing subscription, or unsubscribe; and
subscribing to the stored M2M application resource for the requesting ADN, modifying the existing subscription, or unsubscribing from the existing subscription responsive to the received subscription resource request.

7. A method, in a roamed-in common service entity (CSE) into which an application dedicated node (ADN) configured for a Machine-to-Machine (M2M) application has roamed from an initial CSE, comprising:
receiving a registration request from the ADN;
determining that the ADN is roaming in, from the initial CSE; and
subsequent to said determining, forwarding, to the initial CSE, resource requests from the ADN addressed to the roamed-in CSE.

8. The method of claim 7, wherein the resource requests comprise at least one request for creating, storing, modifying, deleting, adding to, subscribing to, or reading resources of the ADN.

9. The method of claim 7, further comprising processing a deregistration of the ADN with the roamed-in CSE upon receiving a notification that the ADN has roamed out of the roamed-in CSE and into a new roamed-in CSE.

10. The method of claim 7, further comprising notifying the initial CSE that the ADN has roamed out of the roamed-in CSE and into the new roamed-in CSE.

11. An initial common service entity (CSE) configured to maintain resources for a Machine-to-Machine (M2M) application, the initial CSE comprising:
a communication interface circuit configured to communicate with one or more other nodes; and
a processing circuit operatively coupled to the communication interface circuit and configured to:
store M2M application resources for an application dedicated node (ADN) registered to the initial CSE and configured for the M2M application;
detect that the ADN has roamed out of the initial CSE and into a roamed-in CSE;
maintain the M2M application resources for the M2M application subsequent to said detection;
receive a store resource request at the initial CSE, from the roamed-in CSE, wherein the store resource request corresponds to a request by the ADN to the roamed-in CSE to store a new M2M application resource; and
store the new M2M application resource for the ADN at the initial CSE.

12. The initial CSE of claim 11, wherein the processing circuit is configured to receive a notification that the ADN has roamed out of the roamed-in CSE and into a new roamed-in CSE.

13. The initial CSE of claim 11, wherein the processing circuit is configured to create the new M2M application resource.

14. The initial CSE of claim 11, wherein the processing circuit is further configured to:
receive a modify resource request at the initial CSE, from the roamed-in CSE, wherein the modify resource request corresponds to a request by the ADN to the roamed-in CSE to modify, delete or add to a stored M2M application resource; and
modify or add to the stored M2M application resource for the ADN at the initial CSE.

15. The initial CSE of claim 11, wherein the processing circuit is further configured to:
receive a read resource request from the roamed-in CSE, wherein the read resource request corresponds to a request by a requesting ADN to the roamed-in CSE for a stored M2M application resource; and
provide the stored M2M application resource to the requesting ADN responsive to the received read resource request.

16. The initial CSE of claim 11, wherein the processing circuit is further configured to:
receive a delete resource request from the roamed-in CSE, wherein the delete resource request corresponds to a request by a requesting ADN to the roamed-in CSE to delete a stored M2M application resource; and
delete the stored M2M application resource responsive to the received delete resource request.

17. The initial CSE of claim 11, wherein the processing circuit is further configured to:
receive a subscription resource request from the roamed-in CSE, wherein the subscription resource request corresponds to a request by a requesting ADN to the roamed-in CSE to subscribe to a stored M2M application resource, modify an existing subscription or unsubscribe; and
subscribe to the stored M2M application resource for the requesting ADN, modify the existing subscription, or unsubscribe from the existing subscription responsive to the received subscription resource request.

18. The initial CSE of claim 11, wherein the processing circuit is configured to:
receive a notification that the ADN has roamed out of the roamed-in CSE and into a new roamed-in CSE; and
maintain resources for the M2M application subsequent to receipt of said notification.

19. A roamed-in common service entity (CSE), into which an application dedicated node (ADN) configured for a Machine-to-Machine (M2M) application has roamed from an initial CSE, comprising:
a communication interface circuit configured to communicate with one or more other nodes; and
a processing circuit operatively coupled to the communication interface circuit and configured to:
receive a registration request from the ADN;
determine that the ADN is roaming in, from the initial CSE; and
subsequent to said determination, forward, to the initial CSE, resource requests from the ADN addressed to the roamed-in CSE.

* * * * *